Nov. 10, 1936.  L. G. SIMJIAN  2,060,351
POSE REFLECTING APPARATUS
Filed Oct. 9, 1931  2 Sheets-Sheet 1
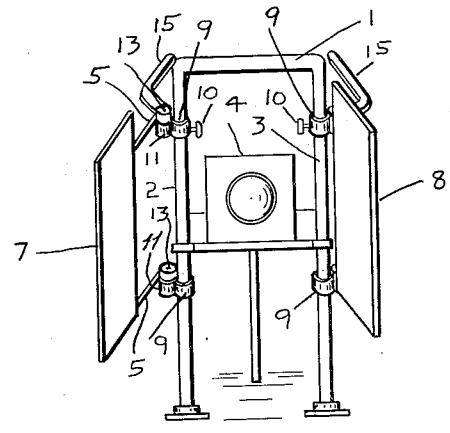
FIG 1
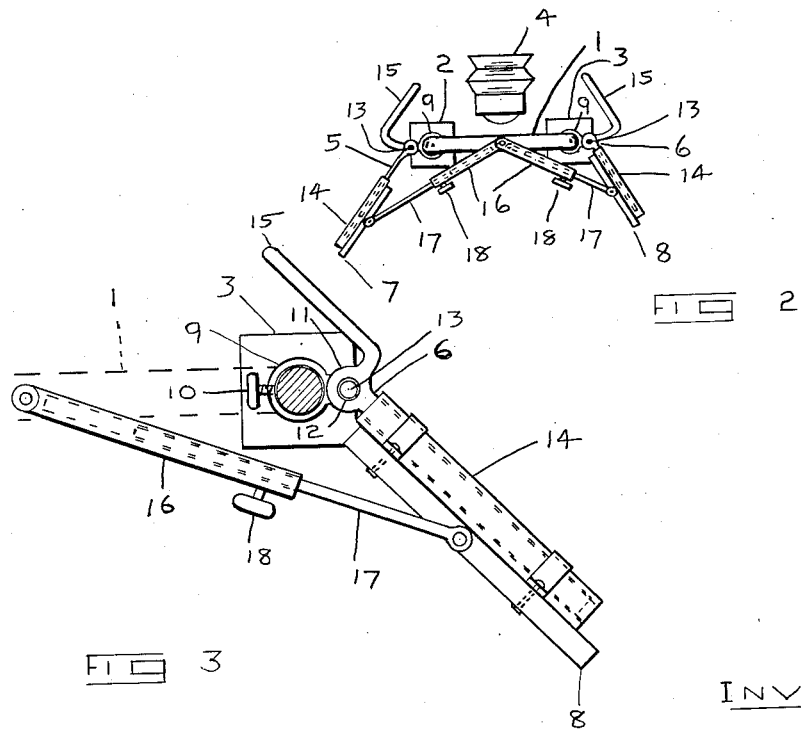
FIG 2
FIG 3
INVENTOR
LUTHER G. SIMJIAN
by George H. Elwell
ATTY

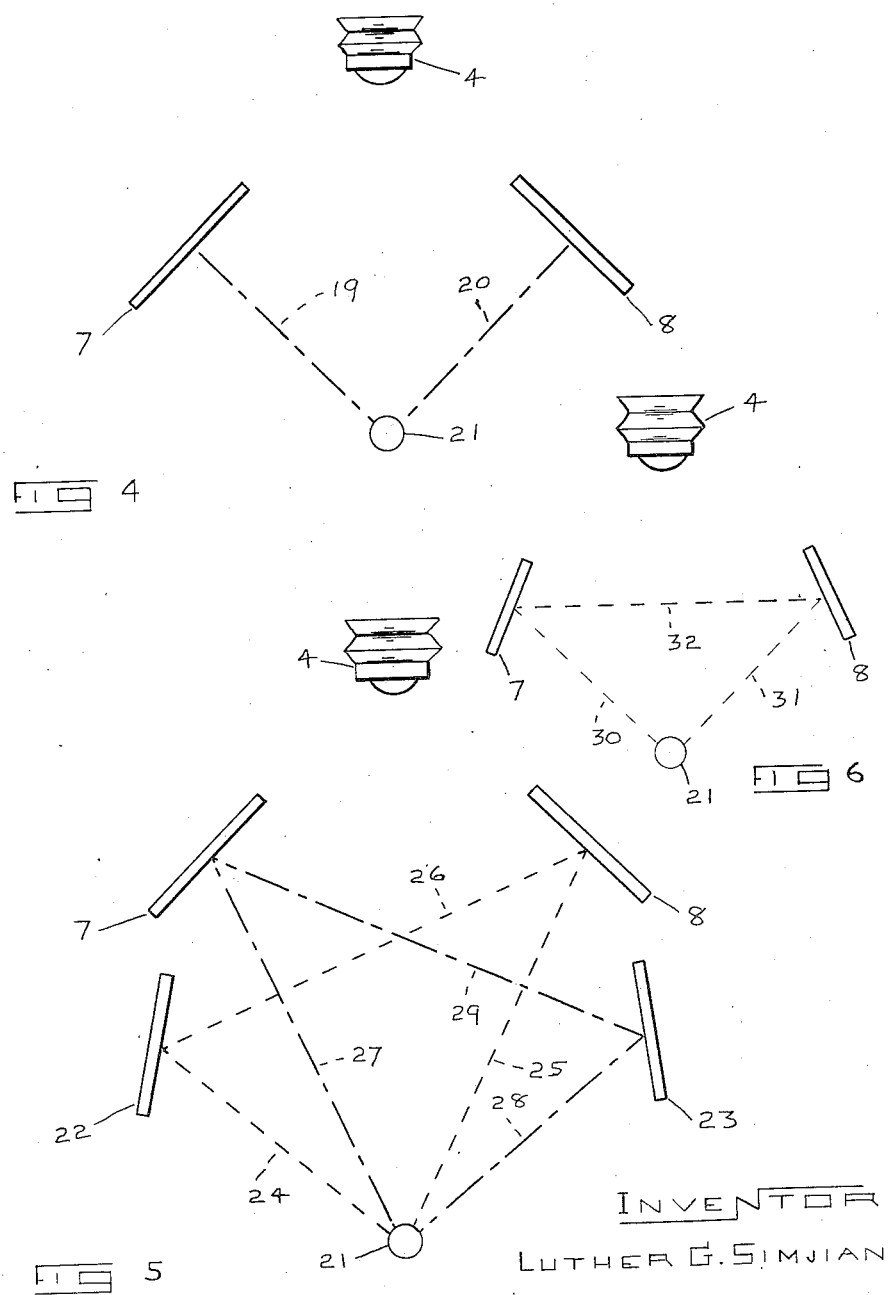

Patented Nov. 10, 1936

2,060,351

UNITED STATES PATENT OFFICE 2,060,351

POSE-REFLECTING APPARATUS

Luther G. Simjian, New Haven, Conn., assignor to Noel Associates, Inc., New York, N. Y., a corporation of New York Application October 9, 1931, Serial No. 567,802

3 Claims. (Cl. 88—97)

This invention relates to pose-reflecting apparatus and the objects of the invention are to provide multiple pose-reflecting mirrors; and to provide such mirrors with an adjustable means adapting the mirrors for various relative fixed positions.

The character of the invention can be best understood by reference to certain combinations of camera and mirrors herein described and illustrated by the accompanying drawings in which the Figure 1 is an upright elevation of the apparatus associated with a camera; the Figure 2 is a top view of the apparatus with mirrors differently adjusted and held by bracing rods; the Figure 3 is an enlarged top view of a section of the apparatus illustrated in the next previous figure; the Figure 4 is a diagrammatic view of one relative arrangement of camera and mirrors adapted to reflect the pose of the posing subject to himself; the Figure 5 is a diagrammatic view of another arrangement of camera and mirrors adapted to reflect the pose of the posing subject to himself at different angles; and the Figure 6 is a diagrammatic view of still another arrangement of camera and mirrors adapted to reflect a semi-profile of the posing subject to himself.

The invention about to be described is an improvement of the device disclosed by your petitioner in U. S. Patent Number 1,830,770 issued November 10, 1931 for a Pose-reflecting system for photographic apparatus, and it is to be understood that the improved apparatus is adapted and intended, whenever desired, to be used by way of partial substitution or connection with said pose-reflecting system thus previously disclosed.

Referring more particularly to the drawings, the support 1 includes the spaced vertical uprights 2 and 3, the camera 4 being associated with the support 1 intermediate of said uprights 2 and 3. The pairs of brackets 5 and 6, supporting the mirrors 7 and 8, respectively, are adjustably secured to the uprights 2 and 3, respectively, by means of the collars 9, each collar surrounding an upright 2 or 3, and a thumb-screw 10, carried within a threaded bore of at least one collar 9 upon each upright, and adapted to be screwed tightly against such upright. Laterally extending from each of said collars 9, as a rigid portion thereof, is the hinge-bearing 11 having the bore 12 and being adapted to pivotally support a bracket 5 or 6, each bracket 5 and 6 being provided with a pintle 13 extending into said bore 12. To adjustably mount each mirror 7 and 8 upon a bracket 5 or 6, each mirror 7 and 8 is provided with an elongated sleeve 14 fixed thereto and adapted to receive therein a bracket 5 or 6, telescopically. Upon at least one of each pair of brackets 5 and 6 is carried, adjacent its pivoted extremity, a rigid arm 15 for the convenient manual manipulation or mechanical operation of each mirror 7 and 8 to or from any swung position. Adjustable bracing-rods 16 and 17 are telescopically associated and extend from the mirror 7 or 8, to which the rod 17 is pivotally secured, to the support 1 to which the rod 16, of sleeve formation, is pivotally secured, a thumb-screw 18 relatively securing the telescoped rods 16 and 17 in any desired extended relation, as illustrated by the Figures 2 and 3. The mirrors 7 and 8 may be provided with reflecting surfaces upon one or both sides thereof, and their multiple association is not confined to the combination of a single pair, but may include several pairs of mirrors in order to obtain the desired result, as evidenced by my earlier patent above referred to and as illustrated by the Figures 4, 5, and 6 of the present application.

In operation, the mirrors 7 and 8 may be manually moved away from or toward the support 1 by sliding the sleeves 14 over the brackets 5 and 6 to any desired position of each mirror as regards the support 1. Each mirror may be moved to any swung position upon the pintle 13 by loosening the thumb-screw 18 of the bracing-rods 16 and 17 and manually or otherwise operating an arm 15 the bracing-rods 16 and 17 being thereby relatively adjusted, and the thumb-screws 18 may be retightened to maintain the mirrors 7 and 8 in the swung positions to which they have thus been moved. In the apparatus shown in Fig. 1 the mirrors 7 and 8 may be bodily raised or lowered to any desired level upon the uprights 2 and 3 by loosening the thumb-screws 10 and sliding the collars 9 upon the uprights 2 and 3 and retightening the thumb-screws 10. Among the many relative positions of swinging mirrors, one to the other or others and the camera, that are possible with the improved apparatus, the Figure 4 illustrates in diagrammatic form one of such possibilities in which the relation of the mirrors 7 and 8, one to the other and to the camera 4, is such as provides for a pose-reflection, along the dotted lines 19 and 20, of the posing subject 21 to himself. The Figure 5, however, illustrates diagrammatically the combination of four mirrors 7, 8, 22, and 23 suggesting the possibility of such relative positions of the mirrors 7, 8, 22, and 23 as between themselves and as regards the camera 4, as provides for the pose-reflection of the posing subject to himself along either the equally spaced dotted lines 24, 25, and 26, or the alternate long and short dotted lines 27, 28, and 29. The Figure 6 illustrates the same combination of mirrors and camera as does the Figure 4, but with the mirrors 7 and 8 swung to such relative angle, one to the other, that the posing subject 21 is able to see his semi-profile reflections in either mirror as reflected along the dotted lines 30, 31, and 32. I have described and illustrated a varied use of these swinging mirrors when swung at certain relative angles, but I do not limit myself, with regard to this invention to any particular relative angle or angles of combinations of mirrors or manner of use of the same excepting to within the scope of whatever hereinafter may be claimed.

I claim:

1. A pose reflecting mirror apparatus for cameras combining a frame including a vertical support, a mirror, a hinge support for said mirror on said vertical support permitting angular adjustment of said mirror about said vertical support, a slidable connection between said mirror and said hinge support to enable said mirror to be adjusted bodily toward and away from said vertical support, a manually operable handle secured to said mirror and extending to the rear thereof for ready adjustment of the mirror, and a pair of slidably engaging members arranged above said mirror so as not to obstruct the view thereof, one of said members being secured to said frame and the other to an upper portion of said mirror, and means for securing said members together at selected positions against sliding movement relative to each other to support said mirror in any corresponding selected angular position.

2. A pose reflecting mirror apparatus combining a frame including a vertical support, a mirror, and means for adjustably mounting said mirror on said vertical support comprising a bracket secured to said vertical support, a first member hingedly mounted on said bracket, a second member secured to said mirror, said members having a sliding connection for bodily lateral adjustment of said mirror toward or away from said vertical support, and a pair of slidably engaged elements arranged at one end of said mirror so as not to obstruct the view thereof, one of which is secured to said frame and the other to said mirror at a point spaced from said vertical support, and means for securing said slidable elements to each other in relatively adjusted position to support correspondingly said mirror in a selected angular position.

3. A pose reflecting mirror apparatus for cameras combining a frame including a vertical support, a mirror, a pair of vertically spaced hinge means for supporting said mirror in selected angular positions on said vertical support, a slidable connection between said mirror and each of said hinge supports permitting bodily adjustment of said mirror toward and away from said support, a lever secured to said mirror accessible from the rear thereof for ready manual adjustment of said mirror, and a pair of telescoping relatively slidable members arranged above said mirror so as not to obstruct the normal view thereof, one of said members being secured to said support and the other to the upper part of said mirror, and means for selectively securing said members together against relative sliding movement to support correspondingly said mirror in a selected angular position around said support.

LUTHER G. SIMJIAN.